United States Patent [19]

Reinisch

[11] 4,261,330
[45] Apr. 14, 1981

[54] SOLAR HEAT COLLECTOR

[76] Inventor: Ronald F. Reinisch, 5662 S. Hanover Way, Englewood, Colo. 80111

[21] Appl. No.: 18,267

[22] Filed: Mar. 7, 1979

[51] Int. Cl.³ .................... F24J 3/02; F28F 13/00; C04B 43/00
[52] U.S. Cl. .................... 126/418; 126/450; 165/136; 252/62
[58] Field of Search .............. 126/417, 418, 450, 375; 165/135, 136; 252/62

[56] References Cited

U.S. PATENT DOCUMENTS

| | | | |
|---|---|---|---|
| 3,884,217 | 5/1975 | Wartes | 126/418 |
| 3,937,208 | 2/1976 | Katz et al. | 126/450 |
| 3,939,818 | 2/1976 | Hamilton et al. | 126/432 |
| 3,972,317 | 8/1976 | Gallagher | 126/450 |
| 3,980,071 | 9/1976 | Barber | 126/450 |
| 3,995,613 | 12/1976 | Patll | 126/450 |
| 3,999,536 | 12/1976 | Bauer et al. | 126/450 |
| 4,003,363 | 1/1977 | Grossman | 126/450 |
| 4,010,733 | 3/1977 | Moore | 126/450 |
| 4,011,856 | 3/1977 | Gallagher | 126/448 |
| 4,015,582 | 4/1977 | Liu et al. | 126/450 |
| 4,015,586 | 4/1977 | Vroom et al. | 126/450 |
| 4,023,556 | 5/1977 | Sarazin et al. | 126/445 |
| 4,026,268 | 5/1977 | Bartos et al. | 126/450 |
| 4,033,325 | 7/1977 | Walker | 126/450 |
| 4,033,327 | 7/1977 | Pgi | 126/443 |
| 4,038,967 | 8/1977 | Stout et al. | 126/900 |
| 4,046,135 | 9/1977 | Root et al. | 126/450 |
| 4,051,833 | 10/1977 | Vandament | 126/450 |
| 4,055,163 | 10/1977 | Costello et al. | 126/450 |
| 4,060,071 | 11/1977 | Chayet | 126/450 |
| 4,062,351 | 12/1977 | Hastwell | 126/450 |
| 4,073,283 | 2/1978 | Lof | 126/450 |
| 4,094,301 | 6/1978 | Sorenson et al. | 126/450 |
| 4,120,288 | 10/1978 | Barrett | 126/450 |
| 4,159,017 | 6/1979 | Novi | 126/450 |
| 4,175,542 | 11/1979 | Duchene | 126/450 |

FOREIGN PATENT DOCUMENTS 2305696  11/1976  France .................... 126/450

*Primary Examiner*—James C. Yeung
*Assistant Examiner*—Daniel O'Connor
*Attorney, Agent, or Firm*—Burton & Dorr

[57] ABSTRACT

A solar heat collector having an elongated housing, a segmented absorber plate, inlet and outlet header pipes fluidly connected by a plurality of riser pipes for conducting heat transfer fluid through the collector, multilayered insulation for minimizing heat losses from the collector and at least one segmented, arcuate transparent cover for allowing passage of solar radiation therethrough while isolating the interior of the collector from the elements. The multilayered insulation is constructed so as to withstand temperatures of about 400° F. without any attendant thermal degradation.

18 Claims, 11 Drawing Figures

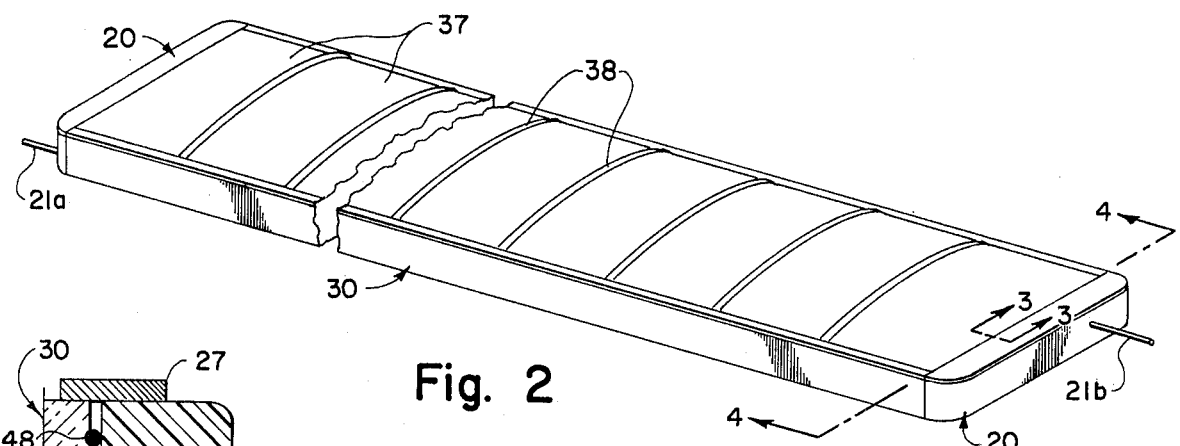
Fig. 2
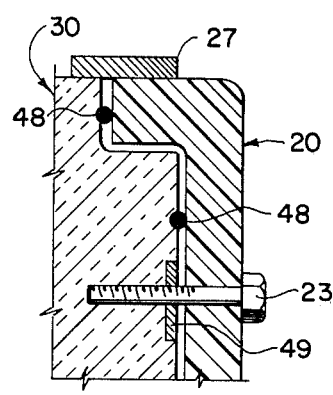
Fig. 3
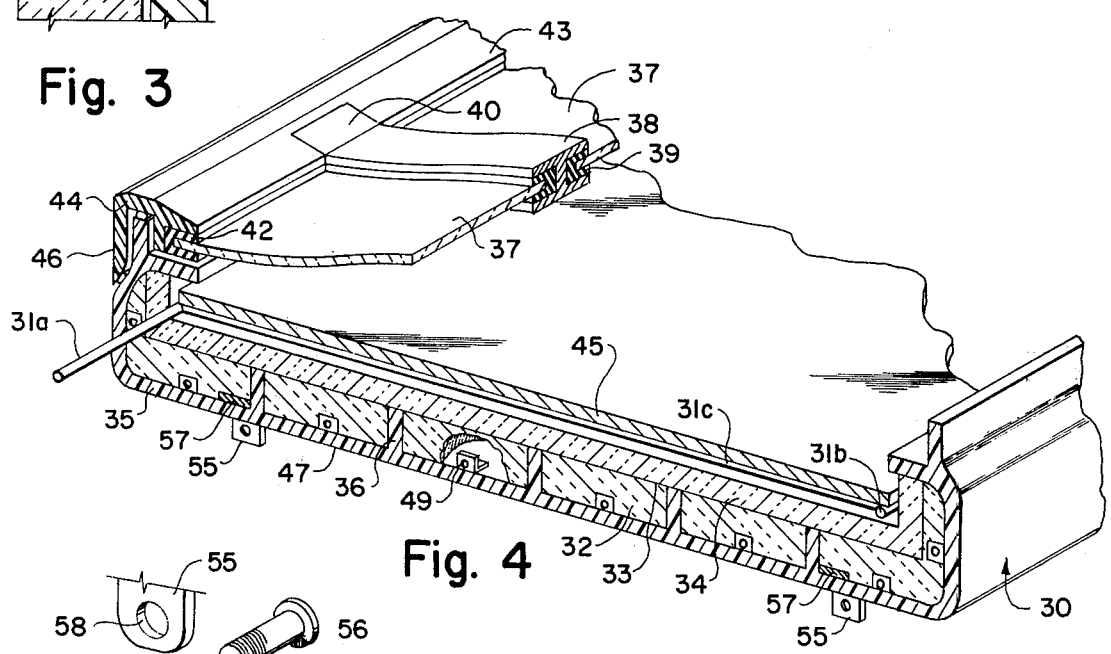
Fig. 4
Fig. 5
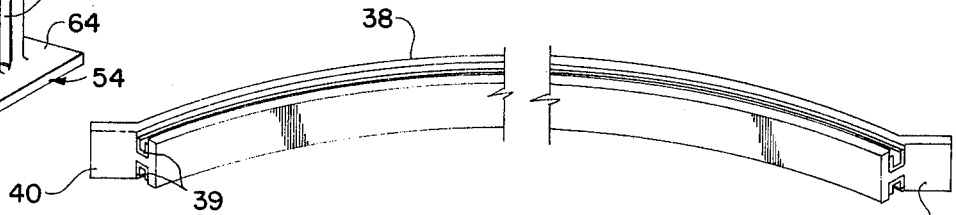
Fig. 6

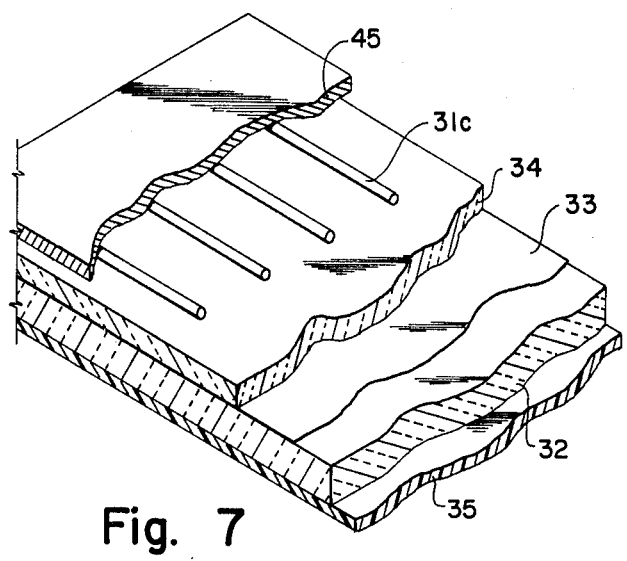
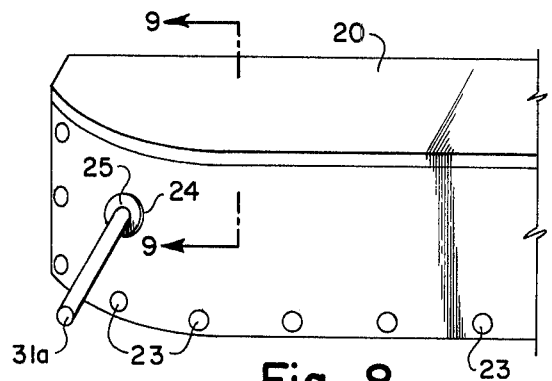
Fig. 7
Fig. 8
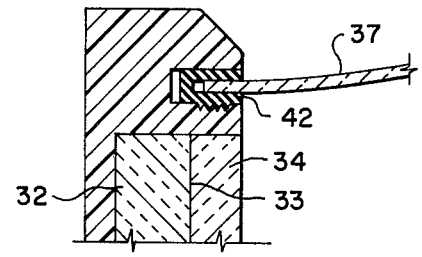
Fig. 9
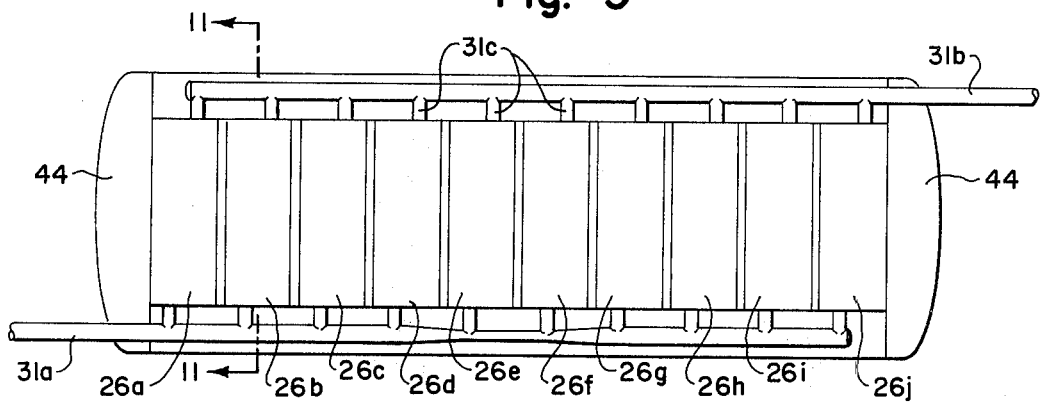
Fig. 10
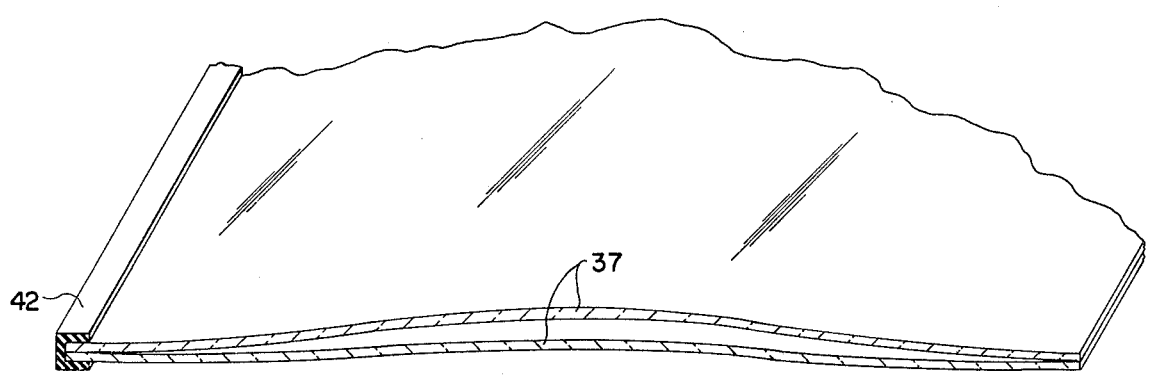
Fig. 11

SOLAR HEAT COLLECTOR

BACKGROUND OF THE INVENTION

1. Field of the Invention

This invention relates to solar heat collectors, and more particularly, to an elongated solar heat collector constructed so as to reduce heat losses therefrom and withstand internal temperatures of about 400° F.

2. Description of the Prior Art

Due to the heightened energy crisis in recent years, development of alternative energy sources in lieu of increased exploitation of rapidly depleting hydrocarbon reserves has become imperative. One such alternative source is solar energy. A myriad of solar energy collector devices have been developed in the prior art for collecting and utilizing radiant energy incident on the earth's surface. A significant number of these devices are plate collectors consisting of an absorber member, a cover glazing and an insulated frame which serves as a supporting structure for the absorber member and its associated heat exchanger, and the frame for maintaining the glazing cover above the absorber plate. However, several serious problems still hamper widespread technical and commercial acceptance and success of current solar energy collectors.

One problem is the relatively large weight of the metal frame and glass cover glazing utilized in constructing conventional collectors (approximately 6 to 9 pounds per square foot). High costs are incurred in transporting and installing these heavy collectors. Often, it becomes necessary to reinforce the roof rafters or wall studs of a structure to provide support for these solar collectors. Moreover, the square or box-like peripheral configuration of these conventional collectors cannot be readily mass produced by fabrication techniques utilizing high production machinery nor be conveniently scaled up to a large area collector so as to suffice the heating requirements of a diverse range of buildings. Further, many prior art solar collectors are fabricated in relatively small modules due to the size restrictions of commercially available glass utilized as cover glazings. Thus, conventional collectors are limited to modules having lengths of 6 to 8 feet and widths of 3 to 4 feet. As a result, the high cost of conventional solar collectors is due in part to the large number of on-site piping or ducting connections necessary to establish fluid communication between modules covering the required collector area. Also, these installed arrays of conventional collectors are plagued with a relatively large heat loss since the perimeter to collector area ratio is extremely high for an array.

The relatively low thermal stability of the plastic insulation utilized is another problem posed by many state of the art solar collectors. Most insulation employed in such collectors can withstand temperatures approximating 300° F. However, these collectors cannot pass stagnation tests (i.e., tests simulating pump or power failures) required by the U.S. Government prior to marketing the collector. During these certifying tests temperatures approach or exceed 400° F. At such temperatures, thermal degradation of the plastic insulation occurs causing the insulation to embrittle thereby losing strength and insulating qualities. In addition, thermal degradation of the insulation will generate relatively small molecular weight volatile compounds which will condense out on cooler surfaces, such as cover glazings, resulting in fogging thereof and reducing the thermal efficiency of the collector. While measures, such as thermostatic temperature control or heat dump panels, can be taken to ensure thermal stability of prior art insulation, the attendant cost and loss of thermal efficiency of the collector render such measures undesirable.

Specifically, the following are representative examples of prior art modular solar collectors. U.S. Pat. No. 3,980,071 issued Sept. 14, 1976 to Barber discloses arrangement solar heat collector modules in a columnar and row array with the column being connected in series with appropriate headers therebetween. U.S. Pat. No. 3,937,208 issued Feb. 10, 1976 to Katz discloses a solar collection system wherein at least one solar collector is positioned on opposite sides of a collector mounting member. A flexible conduit is provided for coupling the header of one collector to the header of another collector, and in a preferred embodiment, the flexible conduit is equipped with quick-release clamps for rapid interconnection with headers of different solar collectors. U.S. Pat. No. 4,073,283 issued Feb. 14, 1978 to Lof relates to a large area solar collector system formed by a plurality of modular collector units arranged in side-by-side and end-to-end relationships and communicating by aligned passageways for transfer of fluids, such as air. U.S. Pat. No. 4,038,976 issued Aug. 2, 1977 to Stout, et al discloses a plurality of solar panels mounted on a pitched roof, each extending from the peak of the roof to the eaves thereof. These panels are fluidly connected in parallel. U.S. Pat. No. 4,055,163 issued Oct. 25, 1977 to Costello et al discloses that a plurality of solar panels may be connected together in parallel, side-by-side fashion. U.S. Pat. No. 3,939,818 issued Feb. 24, 1976 to Hamilton, et al also discloses positioning a plurality of solar heating modules in side-by-side relationship to form an array having a common intake manifold. All of these prior art arrays require extensive on-site installation labor, possess interior collectors which are relatively inaccessible for maintenance or repairs and have unncessary side walls which cast shadows on adjacent collectors. None of these patents recognize the need for an integral solar collector base having a plurality of segmented cover glazings and absorber plates for alleviating and, in some instances, eliminating these problems.

Several other prior art approaches have utilized arrays of module solar collectors having some segmentized elements. U.S. Pat. No. 4,062,351 issued Dec. 13, 1977 to Hastwell discloses modular panels which can be placed side-by-side in parallel or series flow connected together by suitably positioned openings therein. Juxtaposed panels may be placed into a common covering which connects the respective glass coverings of the panels by means of a strip of molding. However, such an array still suffers all of the shortcomings of prior art arrays. U.S. Pat. No. 4,060,071 issued Nov. 29, 1977 to Chayet relates to a solar collector having a box-like fiberglass housing covered by two lites of double strength window glass connected by a mullion. However, conventional plate glass still limits the size of this collector to a preferred length and width of substantially 4 feet by 9 inches each. Thus, an extensive array of these collectors would in most instances by required to suffice the heating requirements of a structure of any appreciable size. U.S. Pat. Nos. 3,972,317 issued Aug. 3, 1976 and 4,011,856 issued Mar. 15, 1977 disclose solar heaters in which a plurality of absorber panels are placed in side-by-side relationship within a suitable housing and are separated by fluid conduits. Typical assemblies are dimensioned 4 feet by 8 feet. Again, the solar heaters proposed by Gallagher would have to be arranged in a typical prior art array to provide for a suitable collector area.

With respect to the insulation provided within solar collectors, the prior art assemblies fail to recognize the need for insulation which can withstand temperatures of about 400° F. without any attendant thermal degradation. U.S. Pat. Nos. 4,051,833 issued Oct. 4, 1977 to Vandament and 4,033,327 issued July 5, 1977 to Pei disclose polyurethane to be a suitable thermal insulating material for solar collectors. U.S. Pat. No. 4,015,582 issued Apr. 5, 1977 to Liu, et al further discloses polystyrene foam to be suitable insulating material. Such materials are thermally stable up to about 250° F. for polystyrene foam and up to about 300° F. for polyurethane. U.S. Pat. No. 4,033,325 issued July 5, 1977 to Walker discloses the use of isocyanurate foam as thermal insulation for a solar collector. However, isocyanurate foams possess a maximum service temperature of approximately 300° F. To reiterate, none of the prior are solar collectors utilize insulation possessing thermal stability at temperatures of about 400° F. nor is the need therefore recognized by the skilled artisan.

Both U.S. Pat. Nos. 3,995,613 issued Dec. 7, 1976 to Patil and 3,999,536 issued Dec. 28, 1976 to Bauer, et al disclose utilizing a moisture-impervious adhesive to bond a layer of thermal insulating material to an absorber surface. Again, there is no recognition of providing an insulative system having thermal stability at about 400° F. Further, both U.S. Pat. Nos. 4,022,556 issued May 17, 1977 to Sarazin, et al and 4,026,268 issued May 31, 1977 to Bartos, et al disclose solar collectors provided with metallic foil bonded to plastic laminate and adhered to foam insulation, respectively. Again, neither patent recognizes the requirement for thermal stability of the insulating member at relatively high temperatures. Thus, a need exists to develop a solar collector which is unitary in construction for ease of installation, yet consists of certain segmented elements thereby facilitating maintenance and/or repair. An additional need exists for providing thermal insulation for solar collectors having thermal stability at about 400° F.

Accordingly, it is an object of the present invention to provide a solar collector which has a unitary base and segmented absorber plates and covers.

It is also an object of the present invention to provide a lightweight, low cost solar collector which covers a relatively large collector area and which may be easily transported as assembled to the roof of a structure.

It is further object of the present invention to provide insulation for a solar collector which does not thermally degrade at temperatures of approximately 400° F.

These and other objects and advantages of the invention will be apparent from the following detailed description and drawing.

BRIEF SUMMARY OF THE INVENTION

The present invention relates to a solar heat collector having an elongated outer shell, an absorber plate positioned therein, inlet and outlet header pipes fluidly connected by a plurality of riser pipes for conducting heat transfer fluid through the collector, multilayered insulation positioned within the outer shell for increasing structural rigidity and for minimizing heat losses from the collector and at least one segmented, arcuate, transparent cover which allows passage of solar radiation therethrough while isolating the interior of the collector from the elements. The elongated outer shell reduces the perimeter-to-collector area ratio thereby minimizing heat losses from the edge of the collector. The multilayered insulation is constructed of a bottom insulating layer having a relatively low temperature stability and a relatively low thermal conductivity, an intermediate layer of metallic foil, and a top insulating layer having a relatively high temperature stability and a relatively low thermal conductivity. This multilayered insulation is bonded together by an adhesive which is heat and light resistant and is stable at temperatures approximating 400° F. As thus constructed, the multilayered insulation can be subjected to temperatures of about 400° F. without any attendant thermal degradation.

BRIEF DESCRIPTION OF THE DRAWINGS

The invention will be more readily understood by reference to the accompanying drawing wherein like reference numerals are utilized to indicate like elements throughout the drawing figures and in which:

FIG. 2 is a top, perspective view of the solar heat collector of the present invention as fully assembled;

FIG. 3 is a partially cutaway, cross-sectional view of the end member and body member of the collector taken along line 3—3 of FIG. 2;

FIG. 4 is a partially cutaway, perspective cross-sectional view of the integral body member of the collector of the present invention taken along 4—4 of FIG. 2;

FIG. 5 is a perspective view of the preferred manner of securing the solar heat collector of the present invention to a structure;

FIG. 6 is a partially cut away, bottom view of a mullion utilized in the solar heat collector of the present invention;

FIG. 7 is a partially cutaway, perspective view of the insulation utilized in the solar heat collector of the present invention;

FIG. 8 is a partially cutaway, side view of the end member utilized in the solar heat collector of the present invention;

FIG. 9 is a partially cutaway, cross-sectional view of the collector's end member taken along line 9—9 of FIG. 8;

FIG. 10 is a top, schematic view of the absorber plate and fluid transporting assemblage of the collector of the present invention; and FIG. 11 is a partially cutaway, cross-sectional view of the cover glazings utilized in the collector of the present invention taken along line 11—11 of FIG. 10.

DETAILED DESCRIPTION

Figure 1:
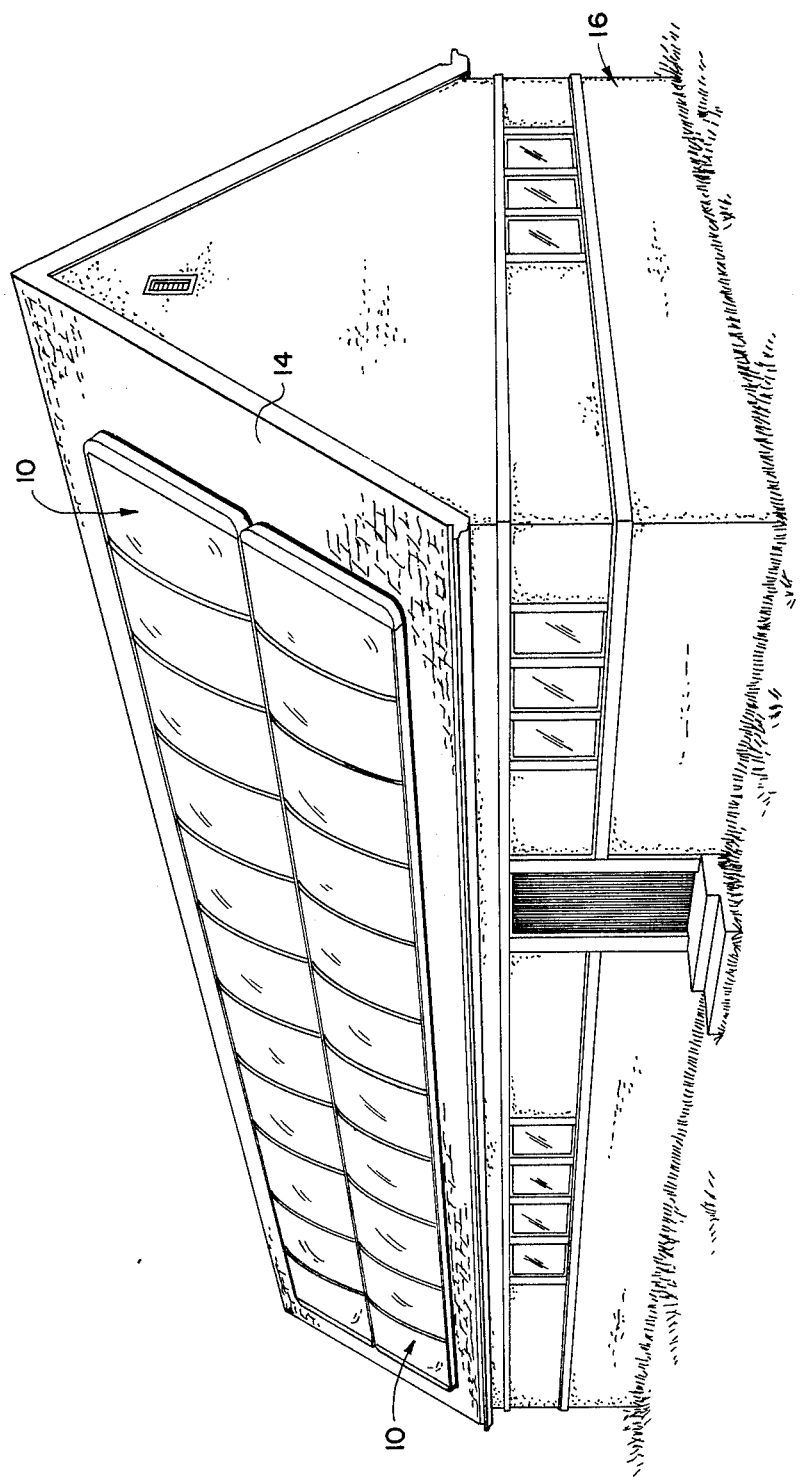
FIG. 1 is a perspective view of the solar heat collector of the present invention secured to the roof of a residential dwelling.

Referring now to FIG. 1, the solar heat collectors of the present invention, illustrated generally as 10, are shown as installed on an inclined roof 14 of a conventional residential dwelling 16. The roof is preferably chosen for having a suitable southern exposure and although the slope of the roof is typically about 30° from the horizontal, the preferred tilt angle of the collector is local latitude plus 15 degrees. The solar heat collectors 10 of the present invention are fixedly secured to the roof in the manner hereinafter described.

Although the solar heat collectors 10 of the present invention are illustrated as being installed on a roof of a conventional residence, these solar heat collectors not only can be installed on the roof of any structure, but may be installed on any suitable inclined surface. It also should be noted that the two solar heat collectors 10, as illustrated in FIG. 1, may be utilized for a common purpose or for dual purposes. For example, one solar heat collector may be utilized to heat hot water while the other solar heat collector may be utilized for space heating of the structure. In addition, although illustrated as having a horizontal orientation as installed on roof 14, solar collectors 10 may be vertically oriented (i.e., from eaves to roof ridge) as installed, for example, to provide for rapid drainage of heat transfer fluid therethrough or of rain or melting snow therefrom.

The solar heat collector 10, illustrated as fully assembled in FIG. 2, comprises a pair of interchangeable end members 20 releasably secured to integral body member 30 in the manner hereinafter described. One end member 20 has a header inlet pipe 21a inserted therethrough near one side thereof. Header 21a communicates with risers within body member 30 (not illustrated in FIG. 2) for transporting suitable heat transfer fluid throughout the solar heat collector. The other end member 20 has an outlet header 21b inserted therethrough near one end thereof. Outlet header 21b communicates with the other end of risers within body member 30 so as to transport heated fluid from the collector. A plurality of transparent glazing covers 37 are provided along the entire longitudinal length of the body member 30 and are held fixedly secured to one another by means of mullions 38 provided therebetween. The edges of the intermediate glazing covers 37 not secured to mullions 38 are supported and sealed by body member 30, as hereinafter described, and the edges of the pair of end glazing covers 37 not supported by mullion 38 are supported and sealed by body member 30 and the adjacent end member 20. End members 20 are fabricated to be interchangeable, i.e., both are provided with a cylindrical bore therethrough positioned on the same side thereof so as to allow for an insertion of a header pipe. Thus, as all end members 20 may be fabricated in the same manner, costs of construction for the assembly are decreased.

The preferred manner of releasably securing end members 20 to body member 30 is illustrated in FIG. 3. End members 20 is releasably secured to body member 30 by means of threaded bolts 23 inserted through bores in the end member and mated with a threaded bore through L brackets 49. L brackets 49 may be fixedly secured to the end of body member 30 by induction heat mounting, by being embedded into the body member 30 or by means of threaded self-tapping bolts. L brackets 49 are uniformly spaced about the peripheral edge of both ends of body member 30. A plurality of gasket sealant strips 48 are bonded to the edge of the end of body member 30 for providing a moisture proof seal between body member 30 and end member 20. Gasket sealant strips 48 may be constructed of strips of polyurethane elastomer, silicone or EPDM (ethylenepropylene-diene). The small seam occuring between the juncture of the end members 20 with body member 30 may be masked by a decorative band 27 which can be constructed of any suitable material, such as aluminum or reinforced plastic.

Turning now to FIG. 4, body member 30 is shown in greater detail. The outer shell 35 of the solar heat collector of the present invention constitutes a housing for other elements of the collector. The outer shell 35 is a generally elongated member having a substantially C-shaped cross sectional configuration. A plurality of ribs 36 are integrally formed with outer shell 35 and, as illustrated, extend upwardly from the bottom face of the outer shell into the interior thereof. Ribs 36 extend longitudinally from one end of outer shell 35 to the other end thereof in a spaced, parallel manner. Ribs 36 provide structural support for the solar heat collector of the present invention as fully assembled. Although illustrated as parallel and longitudinally extending, ribs 36 may extend across the width of outer shell 35 at uniformly spaced intervals along the length thereof. Or, ribs 36 may possess a X-shaped configuration along substantially the entire length and width of the outer shell 35 or any other suitable configuration which will provide adequate structural strength for the solar collector of the present invention as assembled. Further, ribs 36 may extend downwardly from the bottom face of outer shell 35, i.e., the outside of the solar heat collector as fully assembled, or ribs 36 may be positioned on the inside or outside of both of the longitudinally extending side members of outer shell 35. Further, in some instances ribs 36 may not be necessary to provide for adequate structural integrity of the collector, and thus, may be entirely eliminated. Outer shell 35, including ribs 36, can be constructed of any suitable material, such as, thermoplastic or thermosetting polyester, ABS (acrylonitrilebutadiene styrene), thermoplastic acrylic or vinyl ester formulations. The skin member can be fabricated by hand spray up or resin transfer techniques utilizing male and female closed mold, reaction injection molding or any open molding process and by continuous extrusion through shaping dies, as is evident to the skilled artisan. It is preferred to employ a technique where tooling costs do not increase as size is increased.

As previously indicated, L brackets 49 are uniformly spaced about the peripheral edges of both ends of outer shell 35 for attachment of end members 20 thereto. L brackets 49 may be fixedly secured to outer shell 35 by induction heat mounting, by being embedded therein or by using threaded self-tapping bolts. These L brackets are aligned so that the unstanding leg thereof is aligned with the outer peripheral edge 47 of the ends of outer shell 35. A pair of tongues 55 are illustrated in FIGS. 4 and 5 as being secured to the outer shell 35 and extending downwardly therefrom. One of these tongues 55 is positioned near one side of outer shell 35 while the other tongue is symmetrically positioned near the other side of the outer shell. A plurality of pairs of tongues 55 are uniformly spaced along the entire longitudinal length of the outer shell 35 and depend downwardly therefrom. These tongues 55 may be secured to the outer shell in any suitable manner by any suitable means, such as by heads 57 abutting the inner surface of the bottom of the outer shell 35. Tongues 55 are further secured in place by insulation as hereinafter described. These tongues serve a dual function of securing the solar heat collector of the present invention to a structure and providing a grip for facilitating transportation of collectors. Preferably, tongues 55 are constructed of a castable metal, e.g., aluminum or reinforced plastic.

Insulation is positioned within the outer shell 35 and extends the entire longitudinal length thereof along the bottom and both sides. This insulation prevents loss of heat from the collector due to radiation and/or conduction. The insulation is multilayered with the bottom layer 32 contacting the interior surface of the outer shell 35. The bottom insulating layer 32 should have a relatively low temperature stability, e.g., a maximum surface temperature of about 300° F., and a relatively high low conductivity, e.g., 0.11–0.17 Btu-in/hr-ft$^2$-°F. This bottom insulating layer serves to provide rigidity and mechanical strength to the solar heat collector of the present invention as assembled. Bottom layer 32 is preferably constructed of rigid, closed-cell polyurethane foam, preferably isocyanurate-based. Intermediate layer 33 of the insulation is constructed of metal-containing or metallic foil, i.e., having a relatively uniform thickness of less than 10 mil. Preferably, aluminum foil is utilized. This intermediate layer serves to prevent local buildup of heat throughout the insulation and also prevents migration of low molecular weight material, such as uncured resin utilized in bonding, toward the cover glazing thereby preventing fogging of glazing covers 37. The upper layer 34 of the insulation is formed of a material having a relatively high temperature stability, e.g., maximum surface temperature of about 500° F., and a relatively low thermal conductivity, e.g., about 0.20 to about 0.40 Btu-in/hr-ft$^2$-°F. This upper insulating layer 34 is preferably constructed of low density polymide foam. Additives such as glass microspheres, or permalite, a siliceous volcanic rock, may be incorporated therein to reduce cost of the polymide matrix resin without detracting from the properties thereof.

As so constructed, the multilayered insulation utilized in the solar heat collector of the present invention exhibits thermal stability at temperatures of about 400° F., and therefore, at stagnation condition temperatures. The preferred manner of fabricating this multilayer insulation will be hereinafter described.

It should be noted that ribs 36 illustrated in FIG. 4 may extend all the way to the interface between the bottom insulating layer 32 and the intermediate aluminum foil 33. However, preferably, ribs 36 approach but do not reach such interface thereby providing a smooth surface between bottom layer 32 and foil 33 for improved bonding.

As illustrated in FIG. 4, the inlet header pipe 31a and outlet header pipe 31b are positioned on the top insulating layer 34. The header pipes are interconnected by means of a plurality of riser pipes 31c which are uniformly spaced along the longitudinal length of the body of member 30. Typically, riser pipes 31c are of nominal ⅜ inch to ½ inch inside diameter and headers 31a, 31b are larger, e.g., nominal ¾ to 1 inch inside diameter to facilitate securing the risers thereto by any suitable means, such as by welds or mechanical fittings. Header pipes 31a, 31b and riser pipes 31c can be constructed of any suitable material, such as aluminum, copper or reinforced plastic or of any suitable combination of materials, such as plastic lined aluminum pipe. An absorber plate 45 is positioned on top of the riser pipes 31c. The absorber plate 45 may be metallic, e.g., copper or aluminum, or metallic-containing plastic although preferably the absorber plate is constructed of copper because of its resistance to corrosion. The upper surface of the absorber plate is preferably coated with a radiant energy absorbing surface having an absorbance of 0.95 for solar radiation and a thermal emittance of about 0.95 to about 0.30 corresponding to a black body temperature of about 180° F. (82° C.) The black coating can be electrostatically bonded, electroplated as an anodized coating, or applied with a black paint consisting of ferric oxide or carbon particles in a silicone resin binder or in poly (diphenylsiloxy) arylazine. Although as illustrated, absorber plate 45 is positioned on top of risers 31c, it will be evident to the skilled artisan that the absorber plate design may be of the tube above the plate type or the tubes may be constructed integrally with the absorber plate as known in the art. Further, the risers 31c may consist of a plurality of parallel, longitudinally extending tubes. Risers 31c may define any suitable configuration for effective heat transfer inclusive of conventionally known configurations. Absorber plate 45 may be secured to riser pipes 31c by any suitable means, such as by any mechanical means, welds or by a suitable adhesive. The means employed must be resilient enough to withstand expansion and contraction of the absorber plate due to temperature changes. Absorber plate 45 is attached to the insulating core by means of self-tapping screws that pass through slightly oversized holes in the absorber plate and fastened to the top of the insulation (not illustrated). It should be noted that the exposed surface of the insulation positioned along the interior side walls of body member 30 may be protected by black paint or black metallic foil against ultraviolet radiation, moisture, impact and surface damage.

Molding edges 43 (only one illustrated in FIG. 4) intermesh with the uppermost edges of the outer shell 35 and extend along the longitudinal length thereof. Molding edges 43 consist of a reinforced skin 46, e.g., polyester, with a rigid, high density foam core 44, e.g., polyurethane. The fabrication of molding edges 43 is performed by molding techniques known in the art such as fabrication by continuous extrusion through shaping dies. The cross-sectional configuration of molding edge 43 is similar to a C-channel beam so as to resist bending. Molding edges 43 serve as a frame for cover glazings 37 and are attached to the top of outer shell 35 by any suitable means, such as by expansion or self-tapping inserts. As illustrated, strips of elastomeric polyurethane or any other suitable sealant may be positioned between the molding edges 43 and the outer shell 35 and will extend the entire longitudinal length of body member 30. This elastomeric seal may be formed in a longitudinally extending channel in either the outer shell 35 or the molding edge 43 or in both. These seals may or may not be aligned, but will extend along the entire length of the body member 30. It may be preferred to form extremely small vent holes in the sealant to prevent excessive pressure buildup due to air heated within the interior of the solar heat collector. Arcuate cover glazings 47 are secured to molding edge 43 by means of longitudinally extending gasket sealants 42 positioned within a longitudinally extending channel in molding edge 43. Gasket sealant 42 is provided along the top and bottom edges of cover glazings 37 so as to provide a moisture barrier and a flexible gasket to allow for dimensional changes in cover glazing 37 caused by temperature cycling during diurnal operation of the collector. Gasket sealant 42 may be any resilient, moisture impervious sealant, preferably an elastomeric polyurethane, silicones or EPDM (ethylene-propylenediene). Cover glazings 37 are positioned from 0.4 inch to 6.0 inches from the top of absorber plate 45. Cover glazings 37 may be constructed of a polycarbonate, acrylic, fluorocarbon plastic or polyester material and are molded into an arcuate shape by means of vacuum forming or cold forming. Further, cover glazing 37 may be protected from degradation due to ultraviolet radiation by stabilizing additives or coatings of fluorinated ethylene propylene, polyvinylidenefluoride or poly (diphenylsiloxy) arylazine with poly (4,4'-diphenylsiloxy) benzalazine being preferred. Cover glazings 37 are secured to one another by means of mullions 38 as hereinafter described. It should be noted that the top portion of each mullion 38 has an outwardly extending surface 30 (see FIG. 6) at each end thereof serving as an outwardly extending flange which abuts molding edges 43.

Although any suitable means for securing the solar heat collector of the present invention to a structure may be employed, a preferred means is illustrated in FIG. 5. Tongues 55, as previously described with reference to FIG. 4, downwardly depend from the bottom of body member 30 and have bores 58 extending therethrough. Mounting anchors 54 have a flat, parallelpiped base 64 which is fastened by means of bolts to a structure, e.g., to roof purlins which are typically 16 in. to 24 in. on centers, depending on the imposed load. The mounting anchors 54 are preferably made of an anodized aluminum. Projections 60 having aligned axial bores 62 therethrough define a channel 63 therebetween. As assembled, tongues 55 are positioned within channel 63 such that axial bore 58 is aligned with bores 62 of projections 60. Once so aligned, hinge pin 56 is inserted through bores 62 and 58 to releasably secure the solar heat collector to the structure. For ease of handling, it is preferred to initially secure all the tongues depending along one longitudinal side of the outer shell, and thereafter, pivot the entire collector downward until the tongues depending along the other longitudinal side are positioned within the appropriate channels and secured by pins 56. Also, it may be desirable to release all the tongues along one longitudinal side of the collector from corresponding anchors and tilt the entire collector about the other longitudinal side so as to obtain a vertical orientation thereby facilitating repairs or inspections of the collector. It should be appreciated that projections 60 and tongue 55 may be reversed such that tongue 55 projects from base 64 or anchor fitting 54 and projections 60 depend from the solar collector of the present invention. It should also be noted that this method of securing the solar heat collector of the present invention to a structure allows for the collector to be tilted at the proper predetermined angle by varying the dimensions of projection 60 and/or tongue 55.

Mullions 38, illustrated in detail in FIG. 6 are arcuate so as to correspond to cover glazings 37 and have an I-beam cross-sectional configuration so as to provide diametrically opposed channels for insertion of two adjacent cover glazings 37. Mullions 38 may be constructed of any suitable material such as extruded aluminum or reinforced plastic. Each channel of every mullion 38 is lined with a suitable gasket sealant 39 having a corresponding U-shaped cross-sectional configuration. The gasket sealant 39 may be any resiliant, moisture impervious sealant such as, for example, elastomeric polyurethane, silicone, or EPDM (ethylene-propylene-diene). Further, the top portion of each end of mullion 38 has an outwardly extending surface 40 which serves to abut the inner edge of molding edges 43.

The insulation utilized in the solar heat collector of the present invention is illustrated in FIG. 7 as secured to the outer shell 35. The insulation may be installed within and secured to the outer shell 35 in any suitable manner by any suitable means. A preferred manner and means are hereinafter described. The insulation is fabricated by first injecting a isocyanurate-based polyurethane foam into a suitable mold so as to provide a 2-inch thick layer having a density of 3.0 lbs/cu. ft. The mold for this bottom layer 32 may be identical to that used for fabrication of the outer shell 35 or may be a separate matched mold. The mold designed for this procedure may be made of reinforced polyester supported on a steel frame utilizing a low-shrinkage polyester resin and a clear gel coat with a black backup layer. The next step in fabricating the insulation of the present invention involves uniformly bonding the intermediate layer 33 of aluminum foil to the top insulating layer 34 over the entire surface area thereof without the use of heat and pressure. Any adhesive suitable to obtain such bonding may be utilized, although it is preferred to utilize an adhesive which is heat and light resistant, i.e., does not have to be heat cured, and is stable at temperatures approximating 400° F. Examples of suitable adhesives are poly (diphenylsiloxy) arylazines, silicones and fluorinated elastomers. Of these bonding agents, it is most preferred to utilize the poly (diphenylsiloxy) arylazines, which are more fully described in applicant's U.S. Pat. Nos. 3,803,090 and 3,965,096. These adhesives are applied at ambient temperature in a solvent vehicle, such as paint, by dissolving the polymer in tetrahydrofuran. As such, the adhesive can be uniformly applied by spraying or painting thereby producing a cost savings due to a decrease in required labor, energy and materials. The intermediate aluminum foil layer 33 is adhered to the top insulating layer 34 by applying a solution of the heat resistant adhesive in a volatile solvent to the layer 34. The preferred adhesive to utilize is poly (4,4-diphenylsiloxy) benzalazine. The aluminum foil is thereafter applied to the face of the top insulating layer 34 after most of the solvent has evaporated. The remaining solvent wets the two surfaces and adhesion forms therebetween when the two surfaces are brought into facial contact. The process is repeated by applying to the other face of the intermediate aluminum foil layer 33 a solution of the heat resistant adhesive in an organic solvent as previously described. The bottom insulating layer 32 is then applied to the foil after most of the solvent has evaporated and an adhesion forms therebetween. Thus, insulation with improved temperature resistant properties (i.e., thermal stability at temperatures of about 400° F.) is formed from a multilayered structure consisting of a bottom insulating layer 32 and intermediate layer of aluminum foil 33 and a top insulating layer 34. At this stage, the insulation is placed in a mold which is closed and clamped shut. Then the material utilized to construct the outer shell 35, e.g., polyester resin, is reinforced with fibers of glass, carbon, or aramid or with micaflakes, is injected into the mold with conventional dispensing equipment to form the outer shell. A surface finish which provides good appearance and weatherability for the outer shell 35 can be obtained by utilizing a gel coat (pigmented polyester mixture) or an acrylic film. The gel coat can be applied to the mold before injection of the resin to produce molded-in color. In this manner, a range of colors can be applied at the factory. Alternatively, a custom match up color for the outer shell may be obtained by spray painting. As an alternative production method, the outer shell 35 can be formed by spraying a coat of resin impregnated with glass fibers onto the multilayered insulation. Thereafter, a surface finish can be applied as aforedescribed.

Once the insulation is thus constructed and secured to outer shell 35, the risers 31c and inlet and outlet header 31a, 31b (having been previously connected in fluid communication) are inserted through one end of outer shell 35 and positioned on the insulation. Thereafter, the absorber plate 45 is positioned on top of risers 31c.

Turning now to FIG. 8, a side view of end member 20 is illustrated. Bolts 23 are spaced about the side and bottom peripheral edges of end member 20 thereby releasably securing end member 20 with body member 30 via L brackets 49 (not illustrated in FIG. 8). Inlet header pipe 31a is inserted through cylindrical bore 24 and a heat resistant, circular gasket 25 is positioned between the header piping 31a and the end member to provide for a weatherproof seal. The gasket 25 is preferably constructed of fluorocarbon elastomer is resilient enough to allow for lateral movement of the headers 31a and 31b caused by thermal expansion and/or contraction. Thus, it will be appreciated that the same construction is provided for the insertion of the outlet header 31b through the opposite end member 20. Referring to FIG. 9, which is a cross-sectional view of end member 20, it can be appreciated that the fabrication of the end member 20 is similar to the molding technique previously described for body member 30 and the curvilinear reinforced polyester shell thereof is separated from the absorber plate 45 by an insulating core as previously described. Further, that portion of the insulation of end members 20 which is positioned above the absorber plate may be protected by black paint or black metallic foil against ultraviolet radiation, moisture, impact and surface damage. Cover glazings 37 fit into a channel formed within end members 20 and are sealed therein by means of a gasket sealant 42 as previously described. The groove within end member 20 for insertion of cover glazings 37 may be either straight and cover glazings may be pinched therein or may be arcuate to conform to the corresponding cross-sectional configuration of cover glazings 37.

As previously noted, the solar heat collector of the present invention is formed by an integral body member being of substantial length. Also as previously noted conventional cover glazing 37 must be segmented into several cover glazing sections secured together by means of mullions 38. As illustrated in FIG. 10, the absorber plate 26 must also be segmentized (26a–26j) to extend the entire longitudinal length of the solar heat collector of the present invention. Conventional construction material sizes require both cover glazing 37 and absorber plate 26 to be segmentized so as to construct the solar heat collector of the present invention which is dimensioned to a much greater length than state of the art collectors. Each segment of the absorber plate (26a–26j) may be overlapped with adjacent segments to minimize distortion due to thermal expansion. As further illustrated in FIG. 10, inlet header 31a is configured as to be of decreased diameter near the mid sections 26e and f of the array of absorber plates 26a through 26j. This piping geometry increases the velocity of the heat exchange fluid transported through header 31a as it flows through the center section of the plurality of absorber plates thereby minimizing any uneven distribution of heat exchange fluid. It should be noted that the ratio of the diameter of the risers to the diameter of the header should be as small as practical within the constraints of this piping geometry.

As illustrated in FIG. 11, the cover glazings 37 of the present invention may consist of two spaced apart arcuate members. Both of these members may be constructed of polycarbonate, acrylic, polyester or fluorinated ethylene propylene or may be constructed of any combination thereof. The decision to utilize a single or a pair of arcuate cover glazings is dictated in part by the absorptance to emittance ratio of the absorber plate 45. The absorptance of an absorber is the fraction of light of wavelengths emitted by the sun that is absorbed when light strikes the plate. The emittance of an absorber plate is the fraction of emittance of a perfect black body of light of wavelengths emitted by the heated surface. If this ratio is relatively high, e.g., from 3 to 5, then a single cover glazing 37 may suffice. However, if the absorptance to emittance ratio is relatively low, e.g., on the order of one, then it is preferred to employ a pair of cover glazings as illustrated in FIG. 11 so as to retain emitted heat. Another factor to determine whether to employ a single or a pair of cover glazings 37 is the climate. If the solar collector of the present invention is utilized in a relatively windy and cold climate, a single cover glazing 37 will encounter high heat loss due to convection, and therefore, a pair of cover glazings 37 should be employed.

Thus, it can be appreciated that the solar heat collector of the present invention provides a collector which can be easily installed since headers 31a and 31b are fitted with quick disconnect pipe connections for connection to the appropriate upcomer and downcomer pipes of the piping system of a structure. Further, end members 20 can be easily removed from the body member 30 thereby facilitating removal of absorber plates 26, the associated header assemblies 31a, 31b and risers 31c. Also, the construction of the solar heat collector of the present invention reduces the permimeter to collector area ratio to a value as small as practical (0.07 to 0.19) in a large monolithic solar heat collector thereby minimizing heat loss from the edges of the solar collector. The solar heat collectors of the present invention are constructed of a constant width to facilitate mass fabrication and preferably, are 4 to 8 feet wide and 30 to 45 feet in length.

While various embodiments and modifications of this invention have been described in the foregoing description, further modifications will be apparent to those skilled in the art. Such modifications are included within the scope of this invention as defined by the following claims.

I claim:

1. A solar heat collector comprising:
   means for absorbing solar radiation;
   means for transporting heat transfer fluid through said solar heat collector, said fluid being heated by said absorber means;
   an insulation for minimizing heat losses from said collector, said insulation exhibiting thermal stability at stagnation condition temperatures of about 400° F., said insulation consisting essentially of:
   a first insulating layer having a relatively low temperature stability and a relatively low thermal conductivity:
   a second intermediate layer of metallic foil;
   a third insulating layer having a relatively high temperature stability and a relatively low thermal conductivity;
   means for fixedly securing said first, second, and third layers together, and
   means for housing said absorber means, said transporting means and said insulation, said insulation and said absorber means being relatively positioned to one another such that said third insulating layer is in closer proximity to said absorber means than said first insulating layer whereby said second intermediate layer of metallic foil prevents local buildup of heat throughout said insulation and prevents migration of low molecular weight material generated at said stagnation condition temperatures thereby preventing condensation of said low molecular weight material on cooler surfaces and maintaining a high thermal efficiency for the collector.

2. The solar heat collector of claim 1 wherein said housing means comprises:

an elongated integral outer shell;

a pair of interchangeable end members sealingly and releasably secured to said outer shell; and segmented, arcuate, transparent covers sealingly secured to said outer shell and said interchangeable end members for allowing passage of light therethrough to said absorbing means, whereby said second intermediate layer of metallic foil prevents migration of said low molecular weight material toward said transparent covers thereby preventing fogging of said transparent covers.

3. The solar heat collector of claim 2 wherein said outer shell has longitudinally extending ribs integrally formed therewith to increase the structural strength of said collector.

4. The solar heat collector of claim 3 wherein said ribs project into said first insulating layer.

5. The solar heat collector of claim 1 wherein said second intermediate layer of insulation consists essentially of aluminum foil.

6. The solar heat collector of claim 5 wherein said first insulating layer is stable at temperatures of about 300° F. and has a thermal conductivity of about 0.11 to about 0.17 Btu-in/hr-ft$^2$-°F.

7. The solar heat collector of claim 6 wherein said first insulating layer consists essentially of polyurethane foam.

8. The solar heat collector of claim 7 wherein said polyurethane foam is isocyanurate-based.

9. The solar heat collector of claim 7 wherein said means is an adhesive consisting of poly(diphenylsiloxy)arylazines dissolved in a volatile solvent vehicle.

10. The solar heat collector of claim 9 wherein said means is poly(4,4'-diphenylsiloxy) benzalazine dissolved in tetrahydrofuran.

11. The solar heat collector of claim 5 wherein said third insulating layer is stable at temperatures of about 500° F. and has a thermal conductivity of about 0.20 to about 0.40 Btu-in/hr-ft$^2$-°F.

12. The solar heat collector of claim 11 wherein said third insulating layer consists essentially of a low density polymide foam.

13. The solar heat collector of claim 12 wherein said means is an adhesive consisting of poly(diphenylsiloxy)arylazines dissolved in a solvent vehicle.

14. The solar collector of claim 13 wherein said means is poly(4,4'-diphenylsiloxy)benzalazine dissolved in tetrahydrofuran.

15. The solar heat collector of claim 8 wherein said third insulating layer is stable at temperatures of about 500° F. and has a thermal conductivity of about 0.20 to about 0.40 Btu-in/hr-ft$^2$-°F.

16. The solar heat collector of claim 15 wherein said third insulating layer consists essentially of a low density polymide foam.

17. The solar heat collector of claim 16 wherein said means is an adhesive consisting of poly(diphenylsiloxy)arylazines dissolved in a solvent vehicle.

18. The solar heat collector of claim 17 wherein said means is poly(4,4'-diphenylsiloxy)benzalazine dissolved in tetrahydrofuran.

* * * * *